3,823,175
HALOGENATED NEOPENTYL CHLOROFORMATES

Jurgen H. Exner and Eric R. Larsen, Midland, Mich., assignors to The Dow Chemical Company, Midland, Mich.
No Drawing. Filed Mar. 19, 1971, Ser. No. 126,283
Int. Cl. C07c *69/64;* C08g *51/58, 51/00*
U.S. Cl. 260—463     5 Claims

ABSTRACT OF THE DISCLOSURE

Halogenated monochloroformates of the formula $$(XCH_2)_3CCH_2O\overset{O}{\underset{\|}{C}}Cl$$

and halogenated bischloroformates of the formula $$\underset{\underset{CH_2X}{|}}{\overset{\overset{CH_2X}{|}}{C}}(CH_2O\overset{O}{\underset{\|}{C}}Cl)_2$$

wherein each X is independently Br or Cl have been discovered to be fire retardants for thermoplastic polymers, especially unsaturated polyester. These compounds are also useful intermediates to prepare very desirable fire retardants for fibers.

BACKGROUND OF THE INVENTION

A large number of chloroformates and their method of preparation are well known, see for example Matzner et al., Chem. Rev. *64,* 645 (1964). Chloroformates, however, which have substantial utility as fire retardants or which are desirable intermediates to good fire retardants have not been known. The present invention, therefore, is directed to these new compounds and their use as fire retardant additives and intermediates.

There has been a substantial and long felt need for fire retardants for thermoplastic polymers, especially polymers that are processed into fibers. As a result of this need, a large research effort has been devoted to the discovery and reduction to practice of suitable fire retardants. The discovery of the present invention has made it possible to provide the necessary means to a workable fire retardant system.

SUMMARY OF THE INVENTION

It has now been discovered according to the present invention that new monochloroformates having the formula $$(XCH_2)_3CCH_2O\overset{O}{\underset{\|}{C}}Cl$$

and new bischloroformates having the formula $$\underset{\underset{CH_2X}{|}}{\overset{\overset{CH_2X}{|}}{C}}(CH_2O\overset{O}{\underset{\|}{C}}Cl)_2$$

wherein each X is independently Br or Cl are fire retardant additives for unsaturated polyester. Moreover, it has also been discovered that these compounds provide an effective means to obtain very desirable fire retardant additives which are useful in the preparation of fire retardant fibers, especially fire retardant saturated polyester.

The novel compounds of the present invention may be any of those described by the formulas above. Especially preferred are the two compounds wherein each X is bromine.

The chloroformates of the invention are prepared by known reaction techniques where an alcohol is reacted with phosgene in a one-to-one mole ratio to obtain the mono chloroformate product. Under similar conditions, bischloroformates are prepared by reacting two moles of phosgene with one mole of a glycol. The method of preparation for these compounds is described in Matzner et al. in Chem. Rev., *64,* 645 (1964). More specifically, the new cholroformates of the invention are prepared by reacting trihaloneopentyl alcohol, herein defined as 3-halo - 2,2-bis(halomethyl)propanol, or dihaloneopentyl glycol, herein defined as 2,2-bis(haolmethyl)propane-1,3-diol, with phosgene under conditions shown in the Specific Embodiments.

As noted, the chloroformates of the present invention are useful as fire retardant additives for thermoplastic materials such as unsaturated polyester. When used as such an additive, the compound of the invention is physically incorporated into the polymer in an amount sufficient to give a desirable fire retardant product. This amount may vary widely, but amounts of less than about 30% by weight of the polymer are usually sufficient.

The compounds of the invention, however, are not desirable fire retardants in and of themselves for themoplastic polymers which can be used in the preparation of fibers, such as saturated polyester, but the compounds of the invention do serve as effective fire retardant materials when reacted with other compounds. For example, 2 moles of a monochloroformate of the invention are reacted with one mole of a dihydroxy compound, such as tetrabromobisphenol A or dihaloneopentyl glycol, to form a fire retardant which may be readily used in thermoplastic polymers which are processed into fibers. Also in the same manner, the bischloroformates of the invention may be reacted with 2 moles of a halogenated alcohol, such as tribromoneopentyl alcohol, to give a very desirable fire retardant which is useful in fibers.

SPECIFIC EMBODIMENTS

*Example 1.*—Preparation of Tribromoneopentyl Chloroformate

A dry 2-liter flask containing one liter of benzene was cooled in an ice bath. Into the liquid was bubbled 70 g. (0.7 mole) of phosgene to give a solution of phosgene in benzene. To this solution was added 195 g. (0.6 mole) of tribromoneopentyl alcohol, and then a solution of 47.5 g. (48 ml., 0.6 mole) of pyridine in 100 ml. of benzene was added at a rate such that the temperature was maintained below 10° C. After the addition, the reaction mixture was stirred for 3 hours while the temperature was maintained below 10° C. After the stirring, the ice bath was removed and the reaction mixture was allowed to warm up to room temperature. The mixture was stirred at room temperature overnight and then brought to reflux. Excess phosgene was removed by bubbling nitrogen through the refluxing mixture. The mixture was cooled, washed with 400 ml. of 5% hydrocholric acid and 2 five hundred ml. portions of water. The benzene layer was dried over anhydrous sodium sulfate and the benzene was evaporated. The remaining material was distilled at 0.1 mm. at a boiling point of 86–90° C. to give 215 g. of product for a 93% yield based on the alcohol. The product had a melting point of 55°–57° C. and was analyzed by elemental analysis, nuclear magnetic resonance spectroscopy and infrared spectroscopy to be the desired chloroformate.

*Example 2.*—Preparation of the Bischloroformate of Dibromoneopentyl Glycol

In a 1 liter flask was placed 500 ml. of benzene and 250 g. (2.5 mole) of phosgene. To this solution was added 52.4 g. (0.2 mole) of dibromoneopentyl glycol. At 5° C., 32 ml. (0.4 mole) of pyridine dissolved in 50 ml. of benzene was added. During the addition, temperature was kept below 5° C. After treatment as shown in Example 1, the benzene was evaporated to give 78 g. of an off-white solid which was recrystallized from carbon tetrachloride with charcoal decolorization to yield 56 g. of white crystals. The product had a melting point of 100°–106° C. and was identified by nuclear magnetic resonance spectroscopy and infrared spectroscopy to be the desired bischloroformate.

*Example 3.*—Use of Tribromoneopentyl Chloroformate as a Fire Retardant

In the preparation of a polyester resin, 43 parts of the compound prepared in Example 1 were dissolved in 164 parts of a flammable polyester resin. The resin consisted of 49 parts of styrene and 115 parts of a solid polyester alkyd which was prepared from maleic anhydride, phthalic anhydride and propylene glycol in the approximate ratio of 1:1:2, respectively. The polyester mixture containing the fire retardant was cast into panels by adding 2 parts of 1% benzoyl peroxide to the mixture, placing the mixture into a mold and curing the mixture at 100°–120° C. for 4 hours. The resulting casting was clear, colorless and had a Barcol hardness of greater than 40. The limiting oxygen index (LOI) as determined by ASTM method D2863 was 0.239. A casting prepared without the fire retardant additive had an LOI of 0.180. Thus, it is shown by the higher LOI that the compound of the invention imparts substantial fire retardancy to unsaturated polyester.

*Example 4.*—Preparation of Bis-Tribromopentyl Carbonate

In a reactor was placed 38.8 g. (0.10 mole) of tribromoneopentyl chloroformate, a compound of the invention prepared in Example 1, 32.5 g. (0.10 mole) of tribromoneopentyl alcohol and 150 ml. of benzene. To this mixture was added a solution of 12.5 ml. of pyridine and 30 ml. of benzene with slight cooling over a 10-minute period. The reaction mixture was stirred at room temperature overnight and then washed with 100 ml. of 5% hydrochloric acid. The benzene layer was washed twice with 100 ml. of water and dried over anhydrous sodium sulfate. The benzene was decanted and evaporated to yield 65 g. of light crystals which were recrystallized from carbon tetrachloride. The recrystallized material had a melting point of 109.5° to 111° C. The crystals were analyzed by nuclear magnetic resonance spectroscopy and infrared analysis and found to be the desired carbonate.

*Example 5.*—Preparation of

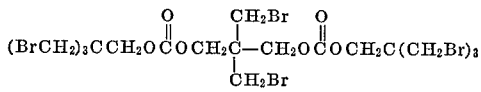

In a manner similar to that described in Example 4, 38.8 g. (0.10 mole) of tribromoneopentyl chloroformate, prepared in Example 1, 13.1 g. (0.05 mole) of dibromoneopentyl glycol and 250 ml. of benzene were mixed and a solution of 8 ml. of pyridine and 40 ml. of benzene was added. After the reaction mixture was stirred for 32 hours, the product was washed with hydrochloric acid and a white solid was obtained which was recrystallized from chloroform. The crystals weighed 39.7 g. and had a melting point of 106° to 110° C.

*Example 6.*—Preparation of

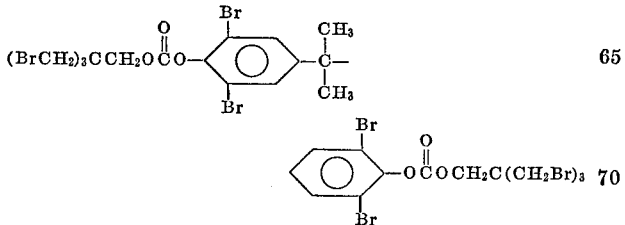

In the same manner as shown in Example 5, 38.8 g. (0.11 mole) of tribromoneopentyl chloroformate, 27.2 g. (0.05 mole) of tetrabromobisphenol A and 250 ml. of benzene were charged to a reactor. To this mixture 8 ml. of pyridine in 40 ml. of benzene was added and the reaction mixture was stirred overnight. After hydrolysis, washing, the benzene layer was evaporated to give a solid material. The solid was dissolved in chloroform, treated with charcoal and recrystallized from benzene to give 42 g. of a white solid having a melting point of 187° to 191° C. The product was identified by nuclear magnetic resonance spectroscopy as the desired compound.

*Example 7.*—Fire Retardancy in Polyester

Using the screening method ASTM-D2863, the fire retardant additives prepared in Examples 4–6 were examined in saturated polyester. In the test procedure, a mixture of polyethylene terephthalate and the desired amount of fire retardant to give the indicated percentage of bromine were mixed at 250° C. using a Brabender mixer. The mixture was then removed from the mill and ground to a powder. A sample of the powder was then fabricated by molding it at a pressure of 17 to 30 tons per sq. in. at 290° to 300° C. on a fibreglass support. A strip of the material 4" by ¼" by ⅛" was cut and burned in the limiting oxygen index test. Compounds giving high LOI for small amounts of additive are most desirable. The results of these examinations are shown in the following table.

TABLE.—FIRE RETARDANCY IN SATURATED POLYESTER

| Additive | | Weight percent Br | L.O.I. |
|---|---|---|---|
| Comp. A | None | | 0.205 |
| Sample: | | | |
| 1 | Compound of Example 4 | 3 | 0.258 |
| 2 | do | 1 | 0.231 |
| 3 | Compound of Example 5 | 5 | 0.277 |
| 4 | Compound of Example 6 | 5 | 0.271 |

*Example 8.*—Light Stability

The light stability of the test samples of Example 7 were examined by placing the samples 7" from a 100 watt AH-4 mercury vapor lamp. Comparative Example 4 with no additive and Samples 1–4 containing fire retardant additives showed no discoloration even after 14 days.

In the same manner as shown in Examples 1 and 2 for the preparation of the brominated monochloroformates and brominated bischloroformates, the chlorinated monochloroformates and chlorinated bischloroformates are prepared by using trichloroneopentyl alcohol instead of tribromoneopentyl alcohol or by using dichloroneopentyl glycol instead of dibromoneopentyl glycol. Also by the appropriate choice of starting materials, the mixed bromochloromonochloroformates and mixed bromochloro bischloroformates are prepared.

Also in a manner similar to that of Examples 4–6, the bischloroformates of the present invention may be used to make suitable fire retardants for saturated polyester. For example, the compound of Example 5 is prepared by reacting the bischloroformate of Example 2 with two moles of tribromoneopentyl alcohol.

We claim:
1. A chloroformate of the formula

or

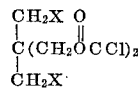

wherein each X is independently Br or Cl.
2. A chloroformate of Claim 1 having the formula

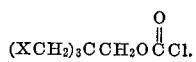

3. A chloroformate of Claim 1 having the formula
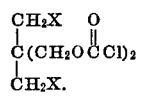
4. A chloroformate of Claim 1 wherein each X is Br.
5. The compound of the formula:
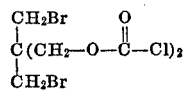
References Cited
UNITED STATES PATENTS
| | | | |
|---|---|---|---|
| 3,382,207 | 5/1968 | Jaquiss | 260—45.7 |
| 3,542,740 | 11/1970 | Pumpelly et al. | 260—77.5 |
LEWIS GOTTS, Primary Examiner
D. G. RIVERS, Assistant Examiner
U.S. Cl. X.R.
260—45.7, 45.95